United States Patent
Carey et al.

(10) Patent No.: US 11,694,174 B2
(45) Date of Patent: Jul. 4, 2023

(54) SYSTEMS AND METHODS FOR KIOSK OR PAYMENT TERMINAL-BASED TOUCHLESS INTERACTIONS USING MOBILE ELECTRONIC DEVICES

(71) Applicant: VeriFone, Inc., Wilmington, DE (US)

(72) Inventors: Clinton Carey, Alpharetta, GA (US); Tony Lucento, Alpharetta, GA (US); Timothy O'Loughlin, Fort Lauderdale, FL (US); Michael Vincent Pulli, Parkland, FL (US)

( * ) Notice: Subject to any disclaimer, the term of this patent is extended or adjusted under 35 U.S.C. 154(b) by 154 days.

(21) Appl. No.: 16/912,632

(22) Filed: Jun. 25, 2020

(65) Prior Publication Data

US 2021/0406852 A1 Dec. 30, 2021

(51) Int. Cl.
*G06Q 20/18* (2012.01)
*G06Q 20/32* (2012.01)
(Continued)

(52) U.S. Cl.
CPC ........... *G06Q 20/18* (2013.01); *G06F 3/0482* (2013.01); *G06F 3/04883* (2013.01);
(Continued)

(58) Field of Classification Search
CPC .... G06Q 20/18; G06Q 20/108; G06Q 20/204; G06Q 20/3223; G06Q 20/3224; G06Q 20/3276; G06Q 20/3825; G06Q 20/4015; G06Q 40/02; G06Q 20/209; G06Q 20/202; G06Q 20/322; G06Q 20/3278; G06Q 20/4012; G06F 3/0482; G06F 3/04883; H04L 67/10; H04L 67/52; H04W 12/06
See application file for complete search history.

(56) References Cited

U.S. PATENT DOCUMENTS 10,691,397 B1 * 6/2020 Clements ............... G06F 3/0484
2004/0098740 A1 * 5/2004 Maritzen ............... G06Q 20/327
725/50

(Continued)

OTHER PUBLICATIONS

International Search Report and the Written Opinion of the International Searching Authority, International Patent Application No. PCT/US 21/38874, pp. 1-9, dated Sep. 30, 2021.

(Continued)

*Primary Examiner* — Michael Jared Walker
(74) *Attorney, Agent, or Firm* — Bond, Schoeneck & King, PLLC

(57) ABSTRACT

Systems and methods for kiosk or payment terminal-based touchless interactions using mobile electronic devices are disclosed. In one embodiment, at a cloud-based information processing apparatus comprising at least one computer processor, a method for interacting with a kiosk or payment terminal using a mobile electronic device may include: (1) receiving, from a mobile electronic device and at a uniform resource locator, a communication comprising an identifier for a kiosk or payment terminal comprising a screen; (2) receiving, from the mobile electronic device, touch data corresponding to user input to a touch-sensitive input on the mobile electronic device; and (3) communicating the touch data to the kiosk or payment terminal. The kiosk or payment terminal may graphically represent the touch data by moving a cursor on the screen.

20 Claims, 4 Drawing Sheets

(51) Int. Cl.

| | |
|---|---|
| *G06Q 20/10* | (2012.01) |
| *G06Q 40/02* | (2023.01) |
| *G06Q 20/38* | (2012.01) |
| *G06Q 20/40* | (2012.01) |
| *G06Q 20/20* | (2012.01) |
| *H04W 12/06* | (2021.01) |
| *G06F 3/04883* | (2022.01) |
| *G06F 3/0482* | (2013.01) |
| *H04L 67/10* | (2022.01) |
| *H04L 67/52* | (2022.01) |

(52) U.S. Cl.
CPC ......... *G06Q 20/108* (2013.01); *G06Q 20/204* (2013.01); *G06Q 20/3223* (2013.01); *G06Q 20/3224* (2013.01); *G06Q 20/3276* (2013.01); *G06Q 20/3825* (2013.01); *G06Q 20/4015* (2020.05); *G06Q 40/02* (2013.01); *H04L 67/10* (2013.01); *H04L 67/52* (2022.05); *H04W 12/06* (2013.01); *G06Q 20/209* (2013.01)

(56) References Cited

U.S. PATENT DOCUMENTS

| | | | |
|---|---|---|---|
| 2013/0256403 A1* | 10/2013 | MacKinnon Keith | G06Q 20/385 235/375 |
| 2015/0046241 A1* | 2/2015 | Salmon | G06Q 40/00 705/14.18 |
| 2015/0178721 A1* | 6/2015 | Pandiarajan | G06K 19/06112 705/64 |
| 2017/0206516 A1* | 7/2017 | Watson | G06Q 20/3274 |
| 2018/0144337 A1* | 5/2018 | Maniar | G06Q 20/3674 |
| 2019/0080307 A1* | 3/2019 | Katzin | G06Q 20/386 |
| 2020/0349543 A1* | 11/2020 | Gilbert | G06Q 50/26 |
| 2021/0027295 A1* | 1/2021 | Raquepaw | G07F 19/206 |
| 2021/0035086 A1* | 2/2021 | Khan | G06Q 20/204 |
| 2021/0334779 A1* | 10/2021 | Goodwin, III | G06Q 20/405 |

OTHER PUBLICATIONS

International Preliminary Report on Patentability, International Patent Application No. PCT/US2021/038874, pp. 1-6, dated Dec. 13, 2022.

* cited by examiner

SYSTEMS AND METHODS FOR KIOSK OR PAYMENT TERMINAL-BASED TOUCHLESS INTERACTIONS USING MOBILE ELECTRONIC DEVICES

BACKGROUND OF THE INVENTION

1. Field of the Invention

The present disclosure relates generally to systems and methods for kiosk or payment terminal-based touchless interactions using mobile electronic devices.

2. Description of the Related Art

Touchscreen-based transaction kiosks and payment terminals are common in fast food restaurants, movie theaters, airports, and the like. Because the touchscreens are not sanitary, these devices often have to be wiped down. Some customers prefer to interact with a person at the store to avoid touching the touchscreens completely.

SUMMARY OF THE INVENTION

Systems and methods for kiosk or payment terminal-based touchless interactions using mobile electronic devices are disclosed. In one embodiment, at a cloud-based information processing apparatus comprising at least one computer processor, a method for interacting with a kiosk or payment terminal using a mobile electronic device may include: (1) receiving, from a mobile electronic device and at a uniform resource locator, a communication comprising an identifier for a kiosk or payment terminal comprising a screen; (2) receiving, from the mobile electronic device, touch data corresponding to user input to a touch-sensitive input on the mobile electronic device; and (3) communicating the touch data to the kiosk or payment terminal. The kiosk or payment terminal may graphically represent the touch data by moving a cursor on the screen.

In one embodiment, the communication further may include a secure transmission credential.

In one embodiment, the touch data may include a location, a movement direction, a movement speed, a movement length, an entry gesture, etc.

In one embodiment, the method may further include receiving a location of the mobile device; and verifying that the location of the mobile device is within a predetermined distance of the kiosk or payment terminal.

According to another embodiment, at a cloud-based information processing apparatus comprising at least one computer processor, a method for conducting a kiosk or payment terminal-based menu selection using a mobile electronic device may include: (1) receiving, from a mobile electronic device and at a uniform resource locator, a communication comprising an identifier for a kiosk or payment terminal comprising a screen; (2) retrieving a menu for the kiosk or payment terminal; (3) communicating the menu to the mobile electronic device; (4) receiving a menu selection from the mobile electronic device; and (5) communicating the menu selection to the kiosk or payment terminal. The kiosk or payment terminal may reflect the selection on the screen.

In one embodiment, the communication further may include a secure transmission credential.

In one embodiment, the menu may include a mobile-device specific menu.

In one embodiment, the menu may include at least one good or service offered by the kiosk or payment terminal.

In one embodiment, the method may further include receiving an indication to pay for a transaction from the mobile electronic device; and communicating the indication to the kiosk or payment terminal.

In one embodiment, the kiosk may receive payment for the transaction from the payment terminal.

In one embodiment, the method may further include receiving a location of the mobile device; and verifying that the location of the mobile device is within a predetermined distance of the kiosk or payment terminal.

According to another embodiment, at a cloud-based information processing apparatus comprising at least one computer processor, a method for providing transaction-related input to a kiosk or payment terminal using a mobile electronic device may include: (1) receiving, from a mobile electronic device and at a uniform resource locator, a communication comprising an identifier for a kiosk or payment terminal comprising a screen; (2) receiving, from the transaction-related input, a request for transaction-related input from the mobile electronic device; (3) communicating the request for transaction-related input to mobile electronic device; (4) receiving the transaction-related input from the mobile electronic device; and (5) communicating the transaction-related input to the kiosk or payment terminal.

In one embodiment, the communication may also include a secure transmission credential.

In one embodiment, the transaction-related input may include a customer signature, a PIN, a tip amount, a response to a receipt request, an acceptance of terms and conditions, a survey response, an instant credit application, etc.

In one embodiment, the method may further include receiving a location of the mobile device; and verifying that the location of the mobile device is within a predetermined distance of the kiosk or payment terminal.

In one embodiment, the kiosk may communicate the transaction-related input to the payment terminal.

In one embodiment, the payment terminal may be a mobile payment terminal.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for kiosk or payment terminal-based touchless interactions using mobile electronic devices.

Figure 1:
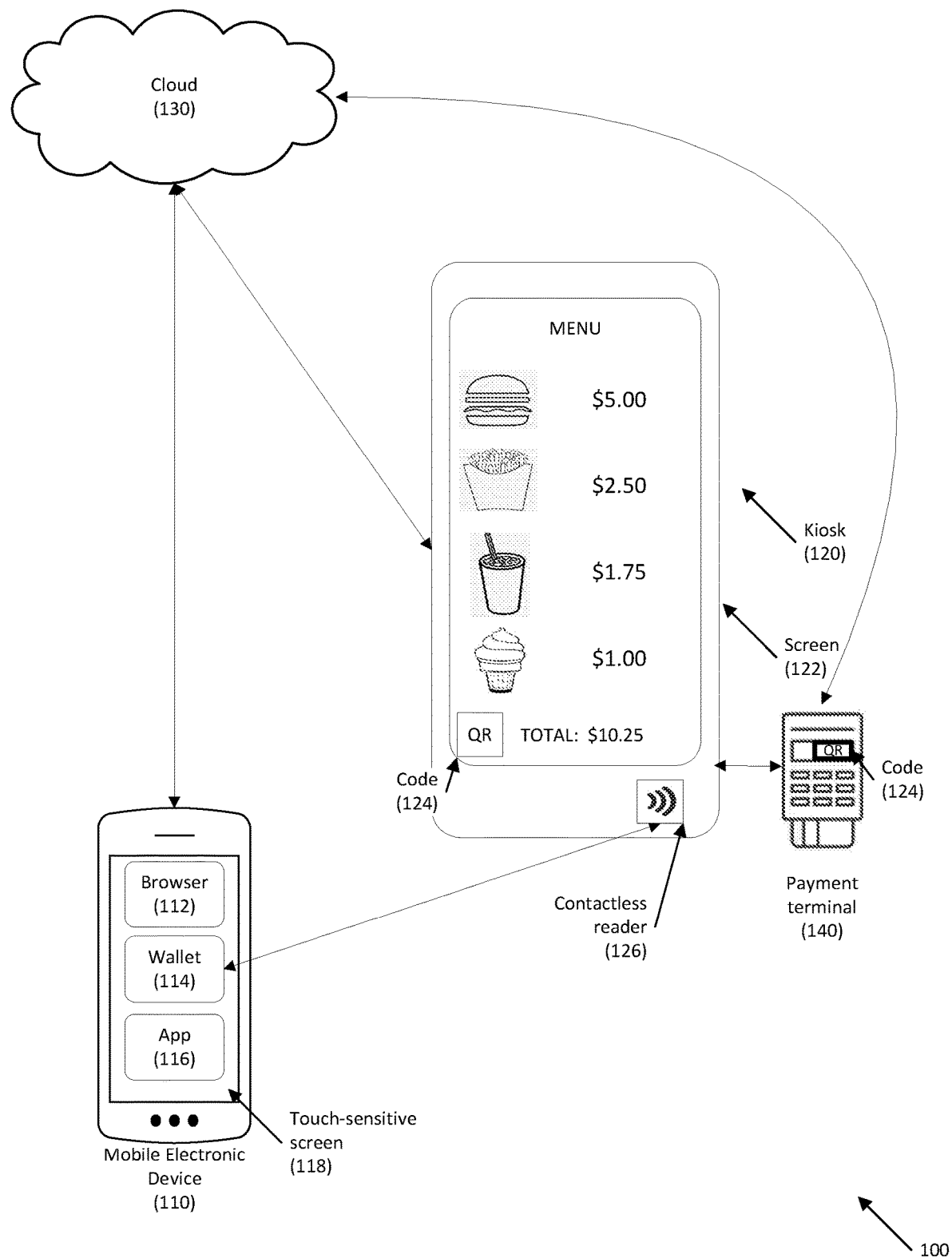
FIG. 1 depicts a system for conducting kiosk or payment terminal-based touchless interactions using mobile electronic devices according to one embodiment.

Referring to FIG. 1, a block diagram of a system for kiosk or payment terminal-based touchless interactions using mobile electronic devices is disclosed according to one embodiment. System 100 may include mobile electronic device 110, which may be a smart phone, a smart watch, a tablet computer, etc. Any suitable mobile electronic device may be used as is necessary and/or desired.

Mobile electronic device 110 may execute browser 112, which may browse to URLs, mobile wallet or payment application 114, and/or application 116 (e.g., an application to interface with kiosk 120 directly or indirectly). In one embodiment, mobile electronic device 110 may include touch-sensitive screen 118 or a similar input device (e.g., a touchpad).

System 100 may further include kiosk 120, which may include touchscreen 122. Touchscreen 122 may provide a menu of goods or services that may be purchased. For example, in a restaurant, the menu may identify different menu items that are available to purchase. At an airport, a menu may provide different flight options, seat selections, etc.

In one embodiment, screen 122 may provide machine-readable code 124. For example, machine-readable code 124 may be a QR code. In one embodiment, machine-readable code 124 may be dynamic, and may change with each transaction, periodically, etc.; in another embodiment, machine-readable code 124 may be static.

Kiosk 120 may include contactless reader 126, such as a NFC reader. Contactless reader may receive payment from wallet 114, from a NFC-enabled credit card, etc.

In one embodiment, kiosk 120 may communicate with payment terminal 140, which may receive contactless payments from wallet 114 or a NFC-enabled credit card. Payment terminal 140 may further receive payments from an EMV reader, magnetic stripe reader, etc.

In one embodiment, kiosk 120 or payment terminal 140 may display a code (e.g., QR code) for an alternate payment mechanism (e.g., PayPal, Venmo, AliPay, etc.), etc.

In another embodiment, kiosk 120 may not be provided, and payment terminal 140 may display the machine-readable code 124, and mobile electronic device may interface with payment terminal 140 via cloud server 130.

In one embodiment, payment terminal 140 may be a mobile point of sale device, a mobile electronic device or computer (e.g., notebook computer, tablet computer, etc.) executing a payment application, etc.

Cloud server 130 may provide an interface between mobile electronic device 110, kiosk 120 and/or payment terminal 140. Cloud server 130 may include one or more cloud-based processors (not shown), one or more database (not shown), etc. In one embodiment, mobile electronic device 110, kiosk 120 and/or payment terminal 140 may access cloud server 130 using a URL.

In one embodiment, cloud server 130 may provide information for mobile electronic device, kiosk 120 and/or payment terminal 140, such as menus (e.g., a full menu for kiosk 120, a mobile menu for mobile electronic device 110, the same menu for both kiosk 120 and mobile electronic device 110, etc.), an interface for receiving a signature and/or a personal identification number (PIN) from mobile electronic device 110, an interface for receiving transaction-related input (e.g., tip amount, receipt request, acceptance of terms and conditions, customer surveys, instant credit applications, loyalty applications, etc.) from mobile electronic device 110, etc. Cloud server 130 may provide other information as is necessary and/or desired.

In one embodiment, cloud server 130 may keep the displays of mobile electronic device 110, kiosk 120 and/or payment terminal 140 synchronized.

Figure 2:
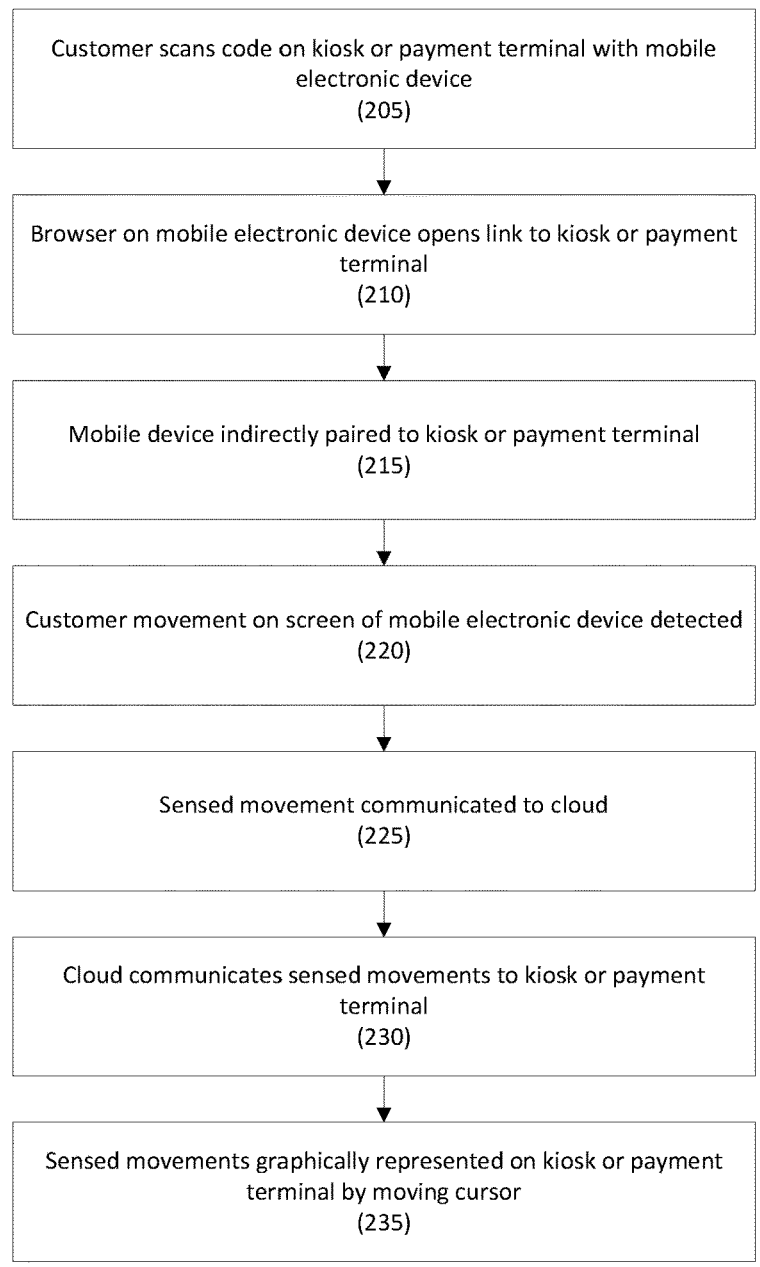
FIG. 2 depicts a method for interacting with a kiosk or payment terminal using a mobile electronic device according to one embodiment.

Referring to FIG. 2, a method for interacting with a kiosk or payment terminal using a mobile electronic device is disclosed according to one embodiment. In one embodiment, instead of having to use a merchant application, the user may instead scan a code, such as a QR code that that identifies a URL and the kiosk or payment terminal, and may control a cursor on the kiosk via a cloud-based server.

In step 205, a customer may approach a kiosk or payment terminal and may scan or enter a code using a mobile electronic device. In one embodiment, the code may be presented on a screen of the kiosk or payment terminal, or it may be affixed to the exterior of the kiosk or payment terminal. In one embodiment, the code may be static, and include a static pointer to a cloud-based URL that is associated with the kiosk or payment terminal; in another embodiment, the code may be dynamic, as the URL may change. The code may further identify the merchant, the kiosk or payment terminal, and may provide any other information as is necessary and/or desired.

In one embodiment, a dynamic URL may be generated for each new connectivity session so that a consumer session and basket data can be sent back to the URL for audit trail recordings as necessary. The dynamic QR may include a merchant specific URL, unique kiosk or payment terminal information (e.g., a kiosk or payment terminal identifier), screen branding for the mobile electronic device screen to match merchant brand requirements, a secure transmission credential (e.g., a TLS 1.2 certificate), etc.

Other types of codes, including standard URLs, short URLs, etc. may be used as is necessary and/or desired. For example, the mobile electronic device may scan a URL and may browse to that location.

In step 210, a browser on the mobile electronic device may browse to the URL in the code. In one embodiment, the browser may include a secure transmission credential (e.g., a TLS 1.2 certificate), the kiosk or payment terminal identifier, etc.

In one embodiment, the cloud server may receive a geolocation for the mobile electronic device and verify that it is near the location of the kiosk or payment terminal.

In step 215, the mobile electronic device may be indirectly paired with the kiosk or payment terminal. In one embodiment, the cloud server may take part in negotiating a secure handshake for encryption of the communication channel between the mobile electronic device and the cloud server.

In step 220, using an application or the browser, the user may interface with the touch-sensitive screen of the mobile electronic device to move a cursor on the kiosk or payment terminal screen, and the movement may be detected by the application or the browser. For example, the user may touch the touch-sensitive screen and move his or her finger in a direction, at a speed, and for a length. In addition, the user may make an entry or selection gesture, such as a double-tap, to enter a selection, such as when the cursor may move over an item on the screen. Other types of inputs may be considered as is necessary and/or desired.

In step 225, the application or browser may communicate the sensed movement to the cloud server. For example, the application or browser may communicate a starting point (e.g., a pixel location) and vector (e.g., direction, velocity, and length) of the sensed movement. The application or browser may also communicate the entry or selection gesture to the cloud server.

In step 230, the cloud server may communicate the sensed movement to the kiosk or payment terminal, and, in step 235, the kiosk or payment terminal may graphically represent the sensed movements by moving a cursor on the kiosk's screen, selection an option, etc. The kiosk or payment terminal may then take the appropriate action based on the cursor position.

Figure 3:
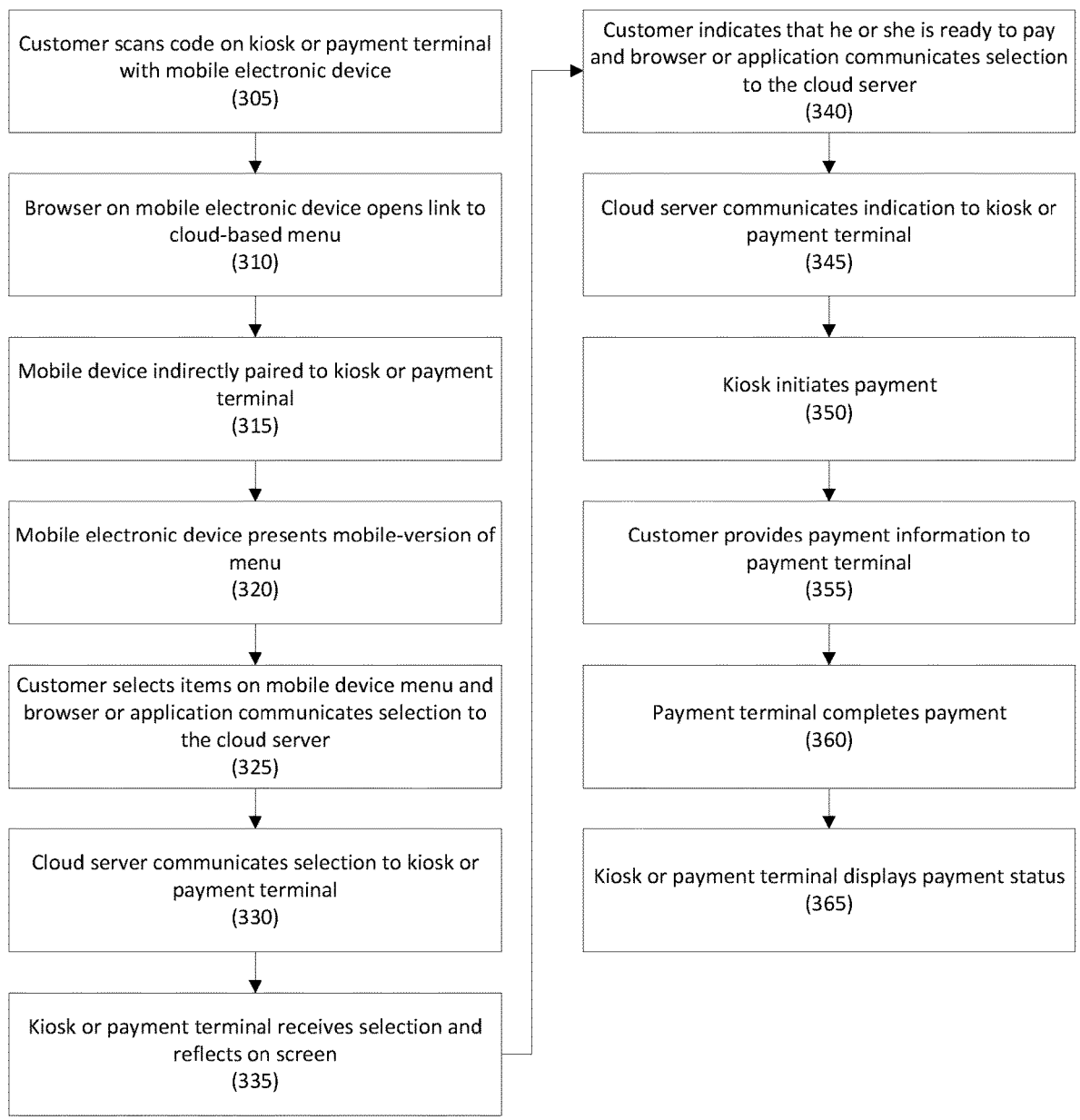
FIG. 3 depicts a method for kiosk or payment terminal-based menu selection using a mobile electronic device according to one embodiment.

Referring to FIG. 3, a method for kiosk or payment terminal-based menu selection using a mobile electronic device is disclosed according to one embodiment. As with the embodiment of FIG. 2, instead of having to use a merchant application, in embodiments, the user may instead scan a code, such as a QR code that that identifies a URL and the kiosk or payment terminal, and may make menu selections on the mobile electronic device and have those selections made on the kiosk or payment terminal.

In step 305, a customer may approach a kiosk or payment terminal and may scan or enter a code using a mobile electronic device. This may be similar to step 205, above.

In step 310, a browser on the mobile electronic device may browse to the URL in the code. This may be similar to step 210, above.

In step 315, the mobile electronic device may be indirectly paired with the kiosk or payment terminal. This may be similar to step 215, above.

In step 320, the browser or an application executed by the mobile electronic device may retrieve a menu of goods or services offered by the kiosk or payment terminal to present on the electronic device. In one embodiment, the menu may be a mobile-version of the menu presented on the kiosk or payment terminal, such as a mobile-device friendly menu; in another embodiment, the menu may be the same as the menu presented on the kiosk or payment terminal. In still another embodiment, the kiosk or payment terminal may only present items selected using the mobile electronic device menu.

In one embodiment, the cloud server may communicate the menu to the mobile electronic device.

In step 325, the customer may select one or more items on the menu presented on the mobile electronic device, and the browser or application presenting the menu may communicate the selection(s) to the cloud server.

In step 330, the cloud server may receive the selection and may communicate the selection to the kiosk or payment terminal.

In step 335, the kiosk or payment terminal may reflect the selection on the screen, by, for example, adding the item(s) to a cart, a list of items to purchase, etc.

In step 340, the customer may indicate that his or her selections are complete by, for example, selecting a "checkout" or "pay now" indicator, making an entry or selection gesture, etc. The browser or application presenting the menu may communicate the indication to the cloud server.

In step 345, the cloud server may receive the indication and may communicate the indication to the kiosk or payment terminal.

In step 350, the kiosk or payment terminal may receive the indication and may initiate payment. In one embodiment, the kiosk may provide instructions for the customer to complete payment using a payment terminal in communication with the kiosk or payment terminal.

In step 355, the customer may complete payment at the payment terminal. For example, the customer may present an electronic wallet on the mobile electronic device, may present a contactless payment device to the payment terminal, may present a code (e.g., QR code) for an alternate payment mechanism (e.g., PayPal, Venmo, AliPay, etc.), etc.

In step 360, the payment terminal may complete payment, and, if the payment terminal conducting the transaction with the kiosk, may return an indication of success or failure to the kiosk. In step 365, the kiosk or payment terminal may inform the customer of the results.

Figure 4:
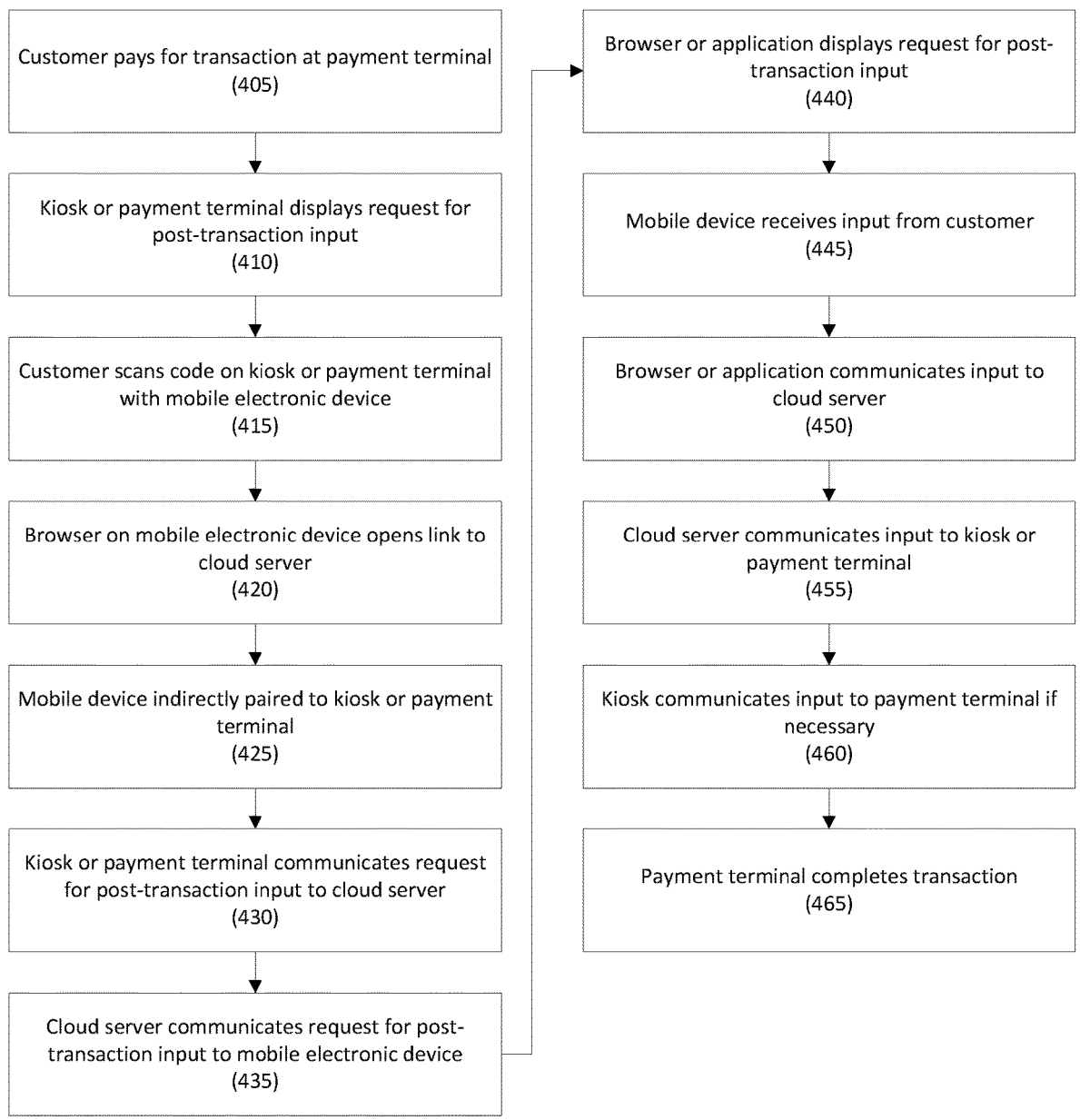
FIG. 4 depicts a method for providing transaction-related input to a kiosk or payment terminal using a mobile electronic device according one embodiment.

Referring to FIG. 4, a method for providing transaction-related input to a kiosk or payment terminal using a mobile electronic device is disclosed according to one embodiment. As with the embodiment of FIGS. 2 and 3, instead of having to use a merchant application, in embodiments, the user may instead scan a code, such as a QR code that that identifies a URL and the kiosk or payment terminal, and may make transaction-related input and selections using the mobile electronic device.

In step 405, a customer may pay for a transaction at a payment terminal or at a kiosk that is associated with a payment terminal.

In step 410, the kiosk or payment terminal may display a request for transaction-related input from the customer, such as a customer signature, a PIN, a tip amount, or receipt request.

In step 415, the customer may scan or enter a code displayed on or at the kiosk or payment terminal using a mobile electronic device. This may be similar to step 205, above.

In step 420, a browser on the mobile electronic device may browse to the URL in the code. This may be similar to step 210, above.

In step 425, the mobile electronic device may be indirectly paired with the kiosk or payment terminal. This may be similar to step 215, above.

In step 430, the kiosk or payment terminal may communicate the request for the transaction-related input to the cloud server.

In step 435, the cloud server may receive the request for transaction-related input and may communicate the request to the mobile electronic device.

In step 440, the application or browser may display the request for transaction-related input. For example, the application or browser may display one or more of a signature area, a PIN entry area, a tip amount selection, a receipt selection, etc.

In step 445, the customer may provide the requested input.

In step 450, the application or browser may digitize the input as necessary (e.g., to convert the signature into digital format) and may communicate the input to the cloud server.

In step 455, the cloud server may communicate the input to the kiosk or payment terminal, which may display the input for the user. In another embodiment, if the kiosk is conducting the transaction with the payment terminal, the cloud server may communicate the input to the payment terminal directly.

In step 460, if necessary, the kiosk may communicate the input to the payment terminal and, in step 465, the payment terminal may complete the transaction with the transaction-related input. For example, the payment terminal may associate the signature and/or PIN with the transaction, may adjust the transaction amount based on the tip amount, may provide a receipt (e.g., instruct a printer to print a receipt, provide a digital receipt, etc.).

It will be appreciated by persons skilled in the art that the present invention is not limited by what has been particularly shown and described hereinabove. Rather, the scope of the present invention includes both combinations and sub-combinations of features described hereinabove and variations and modifications thereof, which are not in the prior art. It should further be recognized that these embodiments are not exclusive to each other.

It will be readily understood by those persons skilled in the art that the embodiments disclosed herein, are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for interacting with a kiosk or payment terminal using a mobile electronic device, comprising:
    pairing the mobile electronic device with the kiosk or payment terminal;
    encrypting, by one or more processors of a cloud server, a communication channel between the mobile electronic device and the one or more processors of the cloud server, wherein the kiosk or payment terminal negotiates a secure handshake for the encrypting;
    receiving, via a uniform resource locator at the one or more processors of the cloud server and from the mobile electronic device, a communication comprising an identifier for the kiosk or payment terminal comprising a screen, wherein the uniform resource locator is associated with a merchant and the kiosk or payment terminal;
    receiving, at the one or more processors of the cloud server and from the mobile electronic device, touch data, wherein the touch data is generated with a touch-sensitive input of the mobile electronic device, the touch data corresponding to input at the screen of the kiosk or payment terminal, and wherein the touch data is detected with an application or browser of the mobile electronic device; and
    communicating, by the one or more processors of the cloud server, the touch data to the kiosk or payment terminal;
    wherein the kiosk or payment terminal graphically represents the touch data by moving a cursor on the screen.

2. The method of claim 1, wherein the communication further comprises a secure transmission credential.

3. The method of claim 1, wherein the touch data comprises a location, a movement direction, a movement speed, and a movement length.

4. The method of claim 1, wherein the touch data comprises an entry gesture.

5. The method of claim 1, further comprising:
    receiving a location of the mobile electronic device; and
    verifying that the location of the mobile electronic device is within a predetermined distance of the kiosk or payment terminal.

6. A method for conducting a kiosk or payment terminal-based menu selection using a mobile electronic device, comprising:
    pairing the mobile electronic device with the kiosk or payment terminal;
    encrypting, by one or more processors of a cloud server, a communication channel between the mobile electronic device and the one or more processors of the cloud server, wherein the kiosk or payment terminal negotiates a secure handshake for the encrypting;
    receiving, via a uniform resource locator at the one or more processors of the cloud server and from the mobile electronic device, a communication comprising an identifier for the kiosk or payment terminal comprising a screen, wherein the uniform resource locator is associated with a merchant and the kiosk or payment terminal;
    retrieving, by an application or browser of the mobile electronic device, a menu for the kiosk or payment terminal;
    communicating, by the one or more processors of the cloud server, the menu to the mobile electronic device to be displayed on the mobile electronic device;
    receiving, by the application or browser of the mobile electronic device, a menu selection from the mobile electronic device, wherein the menu selection is generated with a touch-sensitive input of the mobile electronic device and the menu selection is detected with the application or browser of the mobile electronic device; and
    communicating, by the one or more processors of the cloud server, the menu selection to the kiosk or payment terminal;
    wherein the kiosk or payment terminal reflects the menu selection on the screen.

7. The method of claim 6, wherein the communication further comprises a secure transmission credential.

8. The method of claim 6, wherein the menu comprises a mobile-device specific menu.

9. The method of claim 6, wherein the menu comprises at least one good or service offered by the kiosk or payment terminal.

10. The method of claim 6, further comprising:
    receiving an indication to pay for a transaction from the mobile electronic device, wherein the indication to pay is entered at the mobile electronic device after the menu selection is reflected on the screen of the kiosk or payment terminal; and
    communicating the indication to the kiosk or payment terminal to initiate payment for a transaction.

11. The method of claim 10, wherein the kiosk receives payment for the transaction from the payment terminal.

12. The method of claim 6, further comprising:
    receiving a location of the mobile electronic device; and
    verifying that the location of the mobile electronic device is within a predetermined distance of the kiosk or payment terminal.

13. A method for providing transaction-related input to a kiosk or payment terminal using a mobile electronic device, comprising:
    receiving, via a uniform resource locator at one or more processors of a cloud server and from the mobile electronic device, a communication comprising an identifier for the kiosk or payment terminal comprising a screen, wherein the uniform resource locator is associated with a merchant and the kiosk or payment terminal;
    pairing the mobile electronic device with the kiosk or payment terminal;
    encrypting, by the one or more processors of the cloud server, a communication channel between the mobile electronic device and the one or more processors of the cloud server, wherein the kiosk or payment terminal negotiates a secure handshake for the encrypting;

receiving, at the one or more processors of the cloud server and from the kiosk or payment terminal, a request for transaction-related input from the mobile electronic device;

communicating, by the one or more processors of the cloud server, the request for transaction-related input to mobile electronic device, wherein the request is displayed on the mobile electronic device;

receiving, at the one or more processors of the cloud server, inputted transaction-related information from the mobile electronic device in response to the inputted transaction-related information being received and digitized by the mobile electronic device; and communicating, by the one or more processors of the cloud server, the inputted transaction-related information to the kiosk or payment terminal;

wherein the communicated inputted transaction-related information is used in combination with payment to complete a transaction.

14. The method of claim 13, wherein the communication further comprises a secure transmission credential.

15. The method of claim 13, wherein the transaction-related input comprises a customer signature.

16. The method of claim 13, wherein the transaction-related input comprises a tip amount.

17. The method of claim 13, wherein the transaction-related input comprises a receipt request.

18. The method of claim 13, further comprising:

receiving a location of the mobile electronic device; and verifying that the location of the mobile electronic device is within a predetermined distance of the kiosk or payment terminal.

19. The method of claim 13, wherein the kiosk communicates the transaction-related input to the payment terminal.

20. The method of claim 13, wherein the payment terminal comprises a mobile payment terminal.

* * * * *